UNITED STATES PATENT OFFICE.

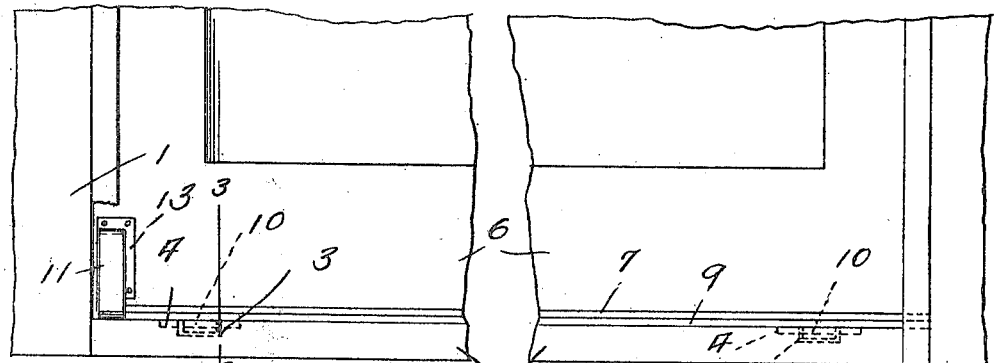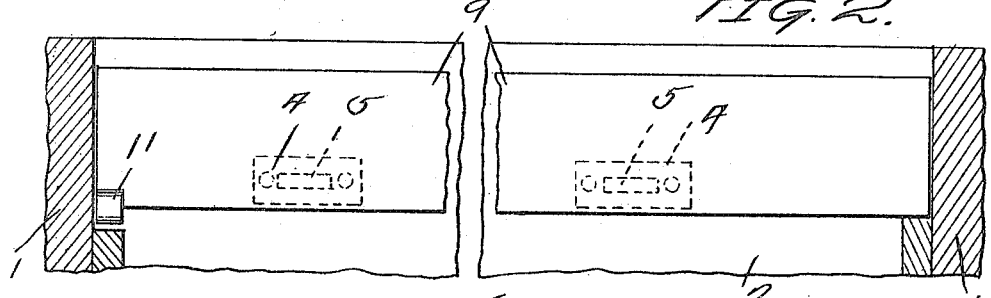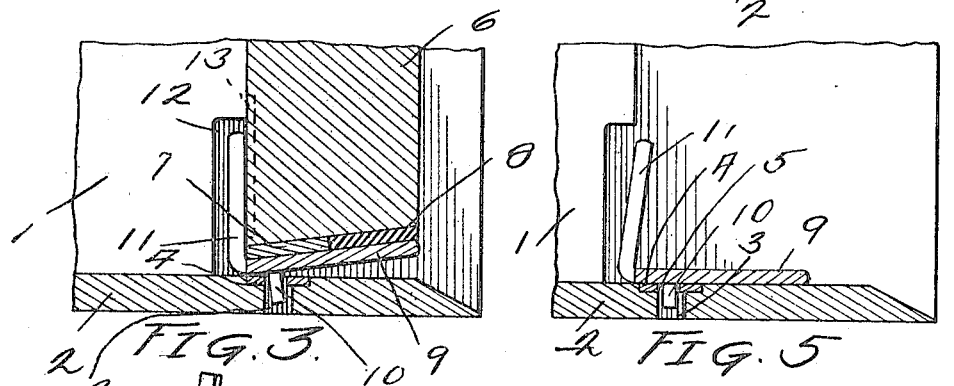

BENJAMIN LOUIS GILBERT, OF SILVERTON, COLORADO.

WEATHER-STRIP.

1,207,741.  Specification of Letters Patent.  Patented Dec. 12, 1916.

Application filed May 10, 1916.  Serial No. 96,592.

*To all whom it may concern:*

Be it known that I, BENJAMIN LOUIS GILBERT, a citizen of the United States, residing at Silverton, in the county of San Juan, State of Colorado, have invented certain new and useful Improvements in Weather-Strips; and I do hereby declare the following to be a full, clear, and exact description of the invention, such as will enable others skilled in the art to which it appertains to make and use the same.

The present invention is directed to improvements in weather strips, and has for its object to provide a device of this character constructed in such a manner that when a door is in its closed position the strip will be actuated to close the space between the threshold strip and lower edge of the door so as to exclude rain, sand or snow.

A further object of the invention is to provide a device of this character so constructed that it can be instantly removed when the door is opened so as to remove any foreign matter which may accumulate thereunder.

A still further object of the invention is to provide a weather strip so constructed that when the door is closing the upper surface of the strip will be scraped so as to insure a perfect fit of the strip with the door.

With these and other objects in view, this invention resides in the novel features of construction, formation, combination and arrangement of parts to be hereinafter more fully described, claimed and illustrated in the accompanying drawing, in which:—

Figure 1 is a front elevation of a door equipped with the device. Fig. 2 is a top plan view of the weather strip. Fig. 3 is a sectional view on line 3—3 of Fig. 1. Fig. 4 is a detailed perspective view of the weather strip. Fig. 5 is a transverse sectional view showing the position of the weather strip when the door is in its open position.

Referring to the drawing 1 designates the door frame and 2 the threshold thereof, said threshold having formed therein spaced sockets 3, the upper ends of which being closed by plate 4, said plates having slots 5 formed therein the purpose of which will appear later. The lower edge of the door 6 has fixed thereto the steel strip 7 and a rubber strip 8 which are adapted to co-act with the weather strip 9, said weather strip being formed from suitable metal and is provided adjacent its inner edges with lugs 10, said lugs being adapted to loosely engage the slots 5 of the plates 4, whereby the weather strip can be swung from a horizontal position to an inclined position upon closing of the door 6.

Formed integral with the inner edge of the strip 9, and at one end thereof is an arm 11 which is engaged by the door when in its closed position so as to swing the strip 9 upwardly with its upper surface in frictional engagement with the strips 7 and 8, thereby insuring a tight fit so as to exclude any foreign matter. The door jamb is provided with a recess 12 for receiving the arm 11 when the door has swung the same inwardly.

From the foregoing description it will be seen that when the door is in the act of closing that the strip 7 will scrape the weather strip 9 and will remove therefrom any foreign matter which may collect thereon. To prevent the wear on the door 6 upon contact with the arm 11 a metal plate 13 is secured to the door for engaging said arm. By providing the lugs 10 it is obvious that the strip 11 can be conveniently removed from the threshold should it be desired to remove any dirt which may collect thereunder.

What is claimed is:—

The combination with a door and its threshold, of a weather strip having lugs carried by its inner edge, slotted plates carried by the threshold, said lugs being loosely pivoted in the slots of the plates and removably engaged therewith, an arm carried by one end of the strip, said arm being engaged by the door to swing said strip upwardly when the door is closed, said door having a strip of metal and a strip of resilient material secured to its lower edge for engaging in the order stated the upper surface of the first named strip as and for the purpose set forth.

In testimony whereof, I affix my signature, in the presence of two witnesses.

BENJAMIN LOUIS GILBERT.

Witnesses:
WILLIAM COLE,
Mrs. ERICK GUSTAFSON.

Copies of this patent may be obtained for five cents each, by addressing the "Commissioner of Patents, Washington, D. C."